Figure 1:
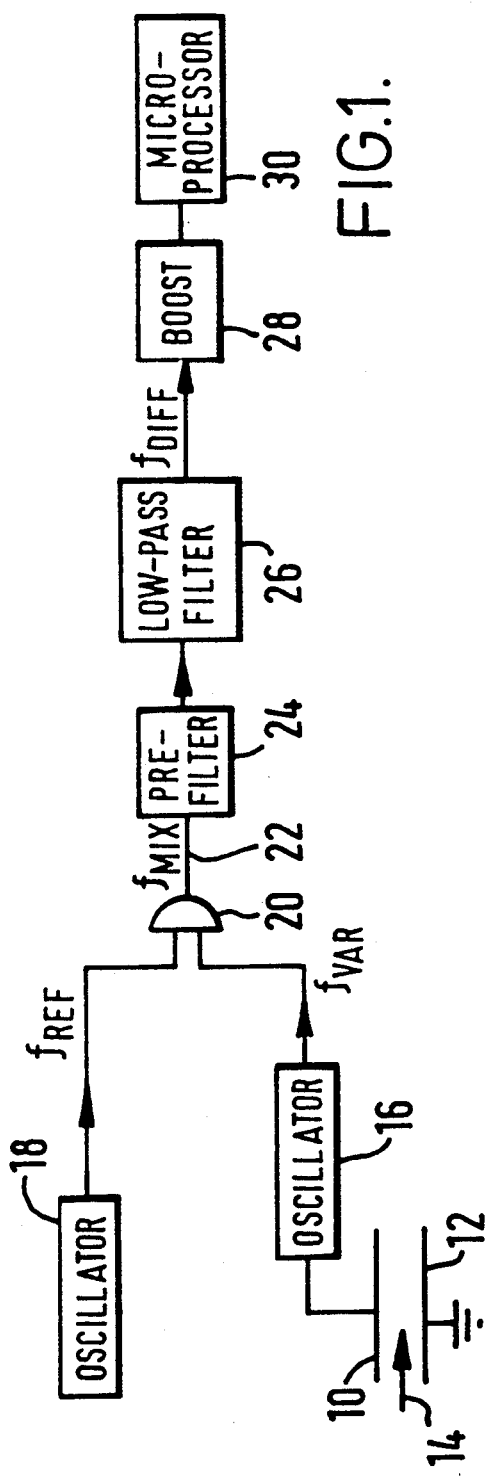

United States Patent [19]
Watkiss et al.

[11] Patent Number: 5,130,672
[45] Date of Patent: Jul. 14, 1992

[54] APPARATUS AND METHOD FOR SENSING THE PRESENCE OF MOVING OBJECTS

[75] Inventors: Michael C. Watkiss, Biggleswade; Allan G. Coaker, Shefford, both of England

[73] Assignee: Watkiss Automation Limited, Bedfordshire, England

[21] Appl. No.: 586,315

[22] Filed: Sep. 19, 1990

Related U.S. Application Data

[63] Continuation of Ser. No. 467,337, Jan. 19, 1990, abandoned, which is a continuation of Ser. No. 183,792, Apr. 30, 1988, abandoned.

[30] Foreign Application Priority Data

Apr. 22, 1987 [GB] United Kingdom ................ 8709465

[51] Int. Cl.⁵ ..................... B65H 7/06; G06K 11/00
[52] U.S. Cl. ..................... 331/65; 271/263; 340/562; 307/526; 307/308; 377/8
[58] Field of Search ............ 377/8; 331/65; 328/134; 307/526, 527, 308; 340/562, 568; 271/265, 263

[56] References Cited

U.S. PATENT DOCUMENTS

| | | | |
|---|---|---|---|
| 3,020,473 | 2/1962 | Cauley | 377/8 |
| 3,683,351 | 8/1972 | Wilcox | 331/65 |
| 3,720,934 | 3/1973 | Sibeud | 331/65 |
| 4,228,393 | 10/1980 | Pile | 331/65 |
| 4,243,216 | 1/1981 | Mazumder | 271/263 |
| 4,358,749 | 11/1982 | Clark | 340/568 |
| 4,368,438 | 1/1983 | Stienstra | 331/65 |
| 4,567,437 | 1/1986 | Hubbard | 331/65 |

*Primary Examiner*—John S. Heyman
*Attorney, Agent, or Firm*—Seidel, Gonda, Lavorgna & Monaco

[57] ABSTRACT

A sensor, especially for detecting misfeeds in a stream of sheets of paper, comprises a pair of sensing plates sensing changes in the capacitance between the plates, a first oscillator providing an output signal at a frequency representative of the capacitance, a second oscillator set to a reference frequency which is the same as or close to that frequency generated by the first oscillator when no object is between the sensing plates, gating means to produce an output representative of the frequency difference between the oscillator outputs, a low-pass filter, and a microprocessor which responds to changes in the difference frequency.

11 Claims, 2 Drawing Sheets

APPARATUS AND METHOD FOR SENSING THE PRESENCE OF MOVING OBJECTS

This is a continuation of co-pending application No.07/467,337 filed on Jan. 19, 1990, now abandoned which is a continuation of application Ser. No. 07/183,792 filed on Apr. 30, 1988, now abandoned.

This invention relates generally to methods of and apparatus for detecting a change in number of an object or objects, i.e. detecting when an object which should be present is absent, or is present in a greater number than desired, or, in the case of a desired plurality of objects, detecting when the number of such objects increases or decreases.

The invention is particularly applicable to the sensing of sheets of material, such as paper or card, and is especially appropriate for the detection of sheets of material in a sheet-feeding system where the sheets are in motion. However, the invention is not limited to sheet-sensing systems, but has much wider application to the detection of objects generally, including both static and dynamic detecting systems.

The present invention is particularly appropriate for monitoring the feeding of sheets of paper, card or like material in sheet-handling machinery, and especially in collating machines.

One known technique for detecting sheets of paper and for sensing misfeeds is a photoelectric technique where a light beam is directed towards the sheet path and associated electrical circuitry functions to detect misfeeds, i.e. the feeding of for example no sheet of paper, or two sheets of paper where only one sheet should be present. Such known systems suffer from the fact that the sensing operation results in an analogue signal which is then treated as an analogue signal throughout the subsequent electrical circuitry.

It is also known to use the capacitance of an object as a measurable parameter. Sensing capacitance is a known technique for sensing paper thickness, in that it is known that the sensed capacitance will vary in dependence upon the thickness of the sheet. However, one of the problems with many situations, particularly dynamic situations, is that over the course of time the characteristics of the object being monitored may change gradually. In certain known sensing systems, whether based on the monitoring of optical properties or capacitance, the system is initially set up to a standard for a single object or a defined number of objects, and a tolerance is provided on each side of the standard level, beyond which the system will trigger a response and the machine will shut down.

Our published UK patent application GB-2115553A describes a system in which changes in number of an object or objects are detected by sensing a parameter of one or a predetermined number of such objects, generating a digital signal from the analogue value, setting up a reference level within digital processing means, repeating the sensing step for further such objects, updating the reference level to reflect changes in the sensed parameter value over a period of time, and actuating an indicator or controller whenever the sensed value falls outside a tolerance band based on the reference level. Preferably, the sensed parameter is the change in capacitance between two plates produced by the presence or absence of the object or objects. Where capacitance is measured, this information is converted into a frequency signal which can then be digitised and used.

However, the system as described in GB-2115553A, while satisfactory for certain applications does have certain limitations. For example, in the sensing or detecting of misfeeds in paper-handling machinery, because of dimensional constraints it is often necessary to use a small sensor plate or plates. With the known sensing system it is then only possible to operate at relatively low speeds.

It is an object of the present invention to provide a sensor and a method of sensing which can be operated at much higher speeds than hitherto, without having to use a substantially larger sensor.

The preferred sensor of the present invention fulfills three objects:
(a) it operates at substantially higher speeds than with conventional sensors as referred to above;
(b) it operates at these higher speeds with a small detector plate or plates;
(c) it has extremely good sensitivity.

These are the three key factors in any sensor which is intended to detect misfeeds in a dynamic situation with accuracy and reliability.

The sensor of the present invention has further advantages. It is unaffected by the presence of dust on the sensing plates, unlike certain known detectors. Also, known infra-red and optical detectors can respond to certain printing inks and cause incorrect signals to be generated. The present sensor is unaffected by printing ink.

It should be emphasised that the sensor and method of the present invention, when operated as a sheet sensor, are not limited to use with sheets of paper, but are appropriate for use with any sheet material, including for example photographic film.

In accordance with the present invention there is provided a sensor for detecting a change in number of an object or objects, comprising sensing means to sense a parameter of one or a predetermined number of such objects located in a sensing zone, a first oscillator connected to receive the sensed parameter information from the sensing zone and to provide an output signal at a frequency which varies in response to changes in the parameter, a second oscillator set to a reference frequency which is the same as or close to that output frequency of said first oscillator which is generated in response to a predetermined steady-state condition in the sensing zone, gating means arranged to receive the outputs of the two oscillators and to provide a signal representative of the frequency difference between said outputs, and processor means arranged to detect and respond to changes in said frequency difference signal.

Preferable, the sensing means is arranged to sense capacitance within the sensing zone.

Also in accordance with the invention there is provided a method of detecting a change in number of an object or objects, comprising sensing a parameter of one or a predetermined number of such objects located in a sensing zone, feeding the sensed parameter information to a first oscillator so as to provide an output signal at a frequency which varies in response to changes in the parameter, setting a second oscillator to a reference frequency which is the same as or close to that output frequency of said first oscillator which is generated in response to a predetermined steady-state condition in the sensing zone, obtaining a signal which is representative of the frequency difference between the outputs of the oscillators, and monitoring the frequency difference signal for changes indicative of a change in number of said objects.

The present invention is based upon the realisation that in the conventional system as described for example in GB-2115553A, one is always looking to detect a relatively small change in a large signal, whereas with the method and apparatus of the present invention, by using two linked oscillators and obtaining a difference signal, one is immediately creating an output signal which is much easier to utilise and to work with, and a signal in which even small changes are more clearly apparent.

Figure 4:
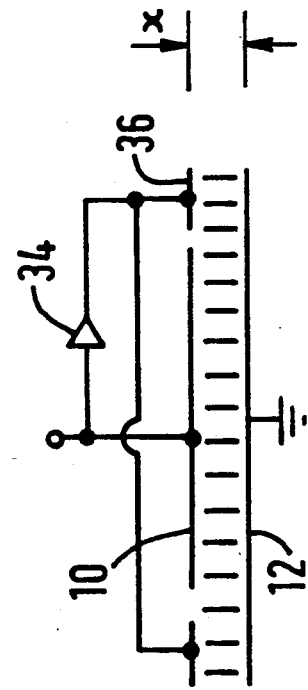
Figure 3:
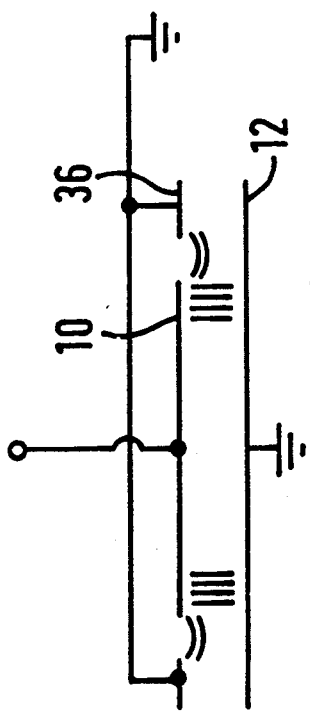
Figure 2:
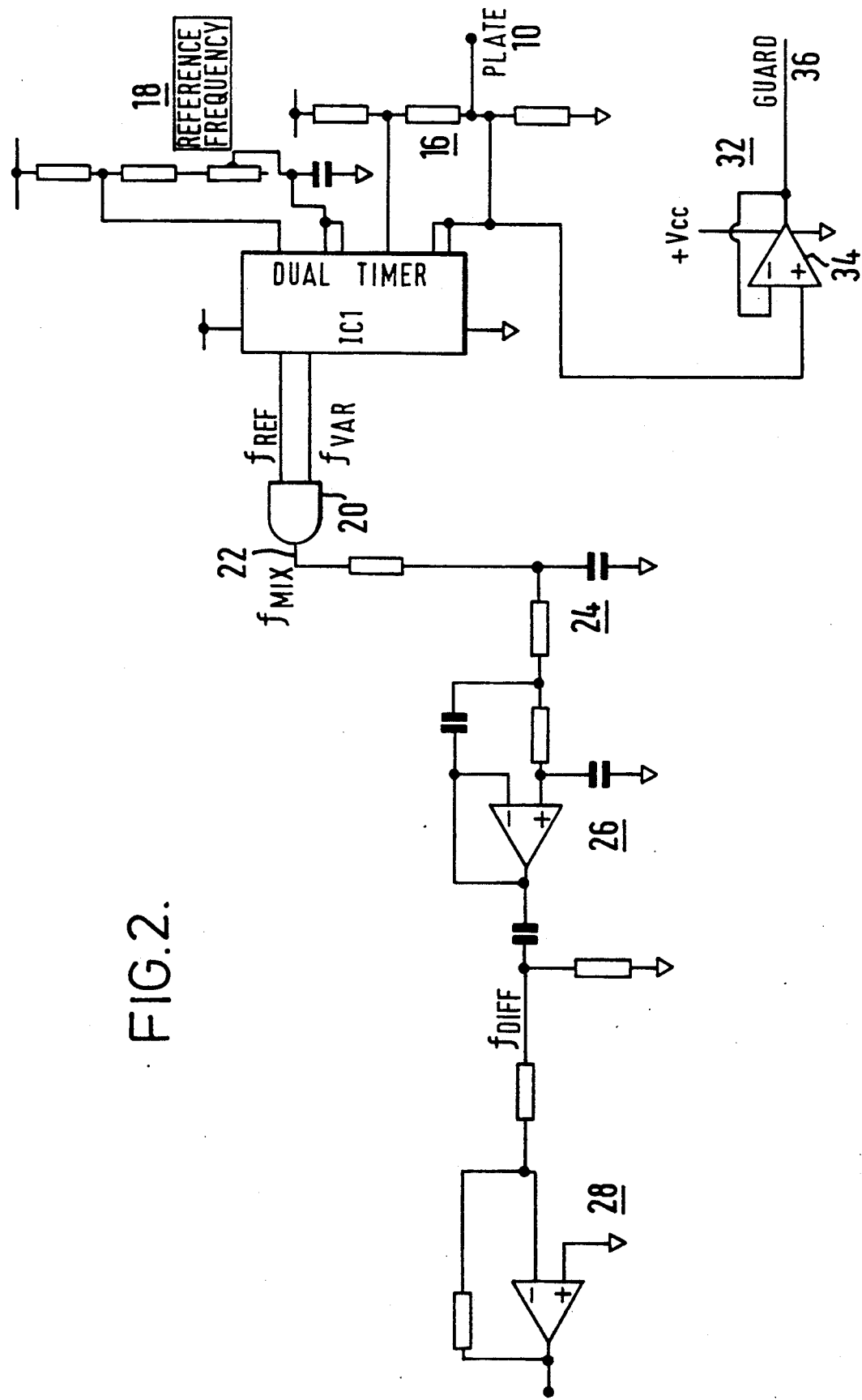

In order that the invention may be fully understood one presently preferred embodiment will now be described by way of example and with reference to the accompanying drawings, in which:

FIG. 1 is a block schematic diagram of the sensor;
FIG. 2 is a circuit diagram of the sensor of FIG. 1;
FIG. 3 is a schematic illustration of one method of using a guard ring around the sensing plates; and
FIG. 4 shows an alternative method of guarding the sensing plates against external influences.

Referring first to FIG. 1, this shows a pair of sensing plates 10 and 12 which define a passage or channel through which objects, preferably sheets of material, such as paper, can pass, as indicated by the arrow 14. The sensing plates 10,12 are adapted to sense the capacitance of the object or objects passing through the channel adjacent to the flat surfaces of the plates. The capacitance signal, which is taken from one plate 10, the other plate being connected to earth, is an analogue signal which is fed to a first oscillator 16. A second oscillator 18 is also provided, and functions as a reference oscillator. In the absence of an object between the plates the first oscillator 16 will generate an output frequency fVAR which is representative of the capacitance of the air between the plates, i.e. the air frequency. The reference oscillator 18 is set to operate at a frequency fREF which is the same as or slightly higher than the air frequency. This reference frequency is preferably of the order of 400 kHz. The frequency difference may be 1 kHz.

A small frequency difference is provided, with the reference frequency being the higher, so that if the "air" frequency drifts higher in use than the sensed frequency fVAR will still not exceed the reference frequency, i.e. the frequency difference will not go from negative to positive. More generally, the oscillator 18 is set to operate at a reference frequency which is the same as or close to that particular output frequency of oscillator 16 which is generated in response to a predetermined steady-state condition in the sensing zone. The steady-state condition, as described above, may be the absence of any object in the sensing zone. A signal from the sensing plates 10,12 representing a change in capacitance will modify the output frequency of oscillator 16, its output frequency fVAR falling in response to an increase in the paper present in the gap between the plates 10 and 12 and rising in response to a decrease in the paper present. The outputs from oscillators 16 and 18 are combined in a gating circuit 20. The output of the gating circuit 20 on line 22 is a mixed signal fMIX having components representing the reference frequency, the sum of the two oscillator frequencies, and the difference between the two oscillator frequencies fDIFF. The mixed signal fMIX is then fed through a pre-filter circuit 24 and a low-pass filter 26. It has been found that it is desirable to set the low-pass filter 26 at a cut-off frequency of the order of 40 kHz. This means that only the difference signal fDIFF appears at the filter output. This output signal is fed to a boost or buffer circuit This output signal is fed to a boost or buffer circuit 28. This difference signal is then fed to a microprocessor 30 which can trigger various reactions or control various functions of the machinery. The microprocessor 30 is preferable programmed to compensate for any problems of "drift", due for example to changes in the air between the plates 10 and 12. The circuitry, including the oscillators and microprocessor, is initially set up so that with no object present in the sensing gap the frequency difference signal fDIFF will be small but detectable, e.g. 1 kHz. With a single object, e.g. a single sheet of paper, in the sensing gap, the frequency fVAR will fall and the frequency difference fDIFF will thus rise to for example 5 kHz. The presence of two overlaid sheets of paper would further increase the frequency difference fDIFF. The microprocessor 30 is programmed to detect and respond to these signal changes.

FIG. 2 shows the sensor of FIG. 1 in more detail in terms of the circuitry. The two oscillators 16 and 18 are embodied in a single dual-timer integrated circuit IC1. This ensures that any external changes, for example of temperature, will affect both oscillators equally.

FIG. 2 also shows the inclusion of a guard ring circuit, indicated generally at 32. Details of the guard ring itself are shown in FIG. 4. The guard ring circuit 32 includes a buffer circuit 34. The output from the guard ring circuit is connected to one of the terminals of IC1 which is common to the oscillator 16.

In any capacitance sensing system it is desirable to screen the sensing plate or plates against the influence of a hand or fingers placed close to the gap or passage through which the sheet material passes. The presence of the operator's fingers near the sensing plate can have as great an effect as the presence of an extra sheet of paper. FIG. 3 shows one arrangement in which a guard ring is used to reduce undesirable effects of this nature. In FIG. 3 the lower sensing plate which is connected to earth is indicated at 12. The upper plate 10 is bounded by a guard ring 36 which is spaced from plate 10. The guard ring 36 is connected to earth. A finger which is positioned close to the gap between the guard ring and the lower plate 12 then has substantially less effect on the field lines between the two plates 10 and 12.

FIG. 4 shows an alternative and better arrangement in which the guard ring 36, instead of being connected to earth as in FIG. 3, is instead connected via a buffer 34 to the plate 10, as shown in FIG. 2. The guard ring is therefore at the same voltage as the plate 10 and there is no voltage difference between the two. Thus, there is no induced capacitance between ring 36 and plate 10, thereby giving a uniform array of field lines out beyond the sensing plate itself. Any disturbance of the field between guard ring 36 and earth plate 12 will not disturb the sensed central zone between the two plates 10,12. Also, with this arrangement, it does not matter where the object, e.g. sheet material, passes between the plates 10,12, i.e. near plate 10, near plate 12, or midway between the two. There is uniformity of field across the full gap or channel.

Particularly when sensing sheets of paper, the sensing plates are preferably elongate rectangular plates, with the guard ring 36 being a narrow strip around the full periphery of the sensing plate 10, spaced from the sensing plate 10 by a constant-width gap. The vertical separation x between the sensing plates is preferably of the order of 5 mm.

We claim:

1. Sheet feeding sensing apparatus for detecting a change in number of at least one sheet and subject to undesirable influences, comprising a pair of spaced parallel sensing plates which are energized to create electric field lines and which define a sensing zone therebetween, feed means to direct a plurality of sheets in succession through said sensing zone, sensing means to sense a parameter of at least one of said sheets when located in the sensing zone, a first oscillator connected to receive the sensed parameter information from the sensing zone and to provide an output signal at a frequency which varies in response to changes in the parameter, a second oscillator set to a reference frequency, said reference frequency being within a predetermined range about the output frequency of said first oscillator which is generated in response to a predetermined steady-state condition in the sensing zone, gating means arranged to receive the outputs of the two oscillators and to provide a signal representative of the frequency difference between said outputs, screening means associated with one of said sensing plates and arranged to reduce disturbance of the electric field lines between the sensing plates caused by said undesirable influences, and processor means arranged to detect and respond to changes in said frequency difference signal.

2. A sensor according to claim 1, in which the sensing means is arranged to sense capacitance.

3. A sensor according to claim 1, in which the predetermined steady-state condition is the absence of any object from the sensing zone.

4. A sensor according to claim 1, which includes a low-pass filter connected to receive the signal output from said gating means.

5. A sensor according to claim 4, in which the low-pass filter has a cut-off frequency of the order of 40 kHz.

6. Apparatus according to claim 1, in which the screening means comprises a guard ring extending peripherally around and spaced from said one sensing plate.

7. A sensor according to claim 6, which the guard ring is connected by was of a buffer to the output from said one plate.

8. A sensor according to claim 1, adapted to detect sheets of paper.

9. A method of detecting a change in number of at least one sheet in a sheet feeding apparatus subject to undesirable influences, comprising establishing a sensing zone including electric field lines between a pair of spaced parallel sensing plates, sensing a parameter of at least one sheet located in the sensing zone, feeding the sensed parameter information to a first oscillator so as to provide an output signal at a frequency which varies in response to changes in the parameter, setting a second oscillator to a reference frequency within a predetermined range about the output frequency of said first oscillator which is generated in response to a predetermined steady-state condition in the sensing zone, obtaining a signal which is representative of the frequency difference between the outputs of the oscillators, screening the sensing plates to reduce disturbance of the electric field lines therebetween caused by said undesirable influences, and monitoring the frequency difference signal for changes indicative of a change in number of said at least one sheet.

10. A method in accordance with claim 9, which includes setting said second oscillator to a reference frequency which is the same as or slightly higher than that output frequency of the first oscillator which is generated in response to the absence of any of said objects from the sensing zone.

11. A method in accordance with claim 9, in which the sensed parameter is capacitance.

* * * * *